United States Patent [19]
DuLac et al.

[11] Patent Number: 5,790,794
[45] Date of Patent: *Aug. 4, 1998

[54] VIDEO STORAGE UNIT ARCHITECTURE

[75] Inventors: Keith B. DuLac, Derby; Paul M. Freeman, Wichita, both of Kans.

[73] Assignee: Symbios, Inc., Fort Collins, Colo.

[*] Notice: This patent issued on a continued prosecution application filed under 37 CFR 1.53(d), and is subject to the twenty year patent term provisions of 35 U.S.C. 154(a)(2).

[21] Appl. No.: 514,013

[22] Filed: Aug. 11, 1995

[51] Int. Cl.$^6$ .......................... H04L 12/40; G06F 13/38
[52] U.S. Cl. .................. 395/200.48; 395/200.47; 370/404
[58] Field of Search .......................... 395/800, 228, 395/200.01, 200.15, 200.16, 200.05, 208, 200.56, 329, 330, 200.55, 200.47, 200.75, 200.33, 200, 62, 200.63; 370/404, 396; 348/7, 12, 6, 14; 455/4.2; 386/101; 364/DIG. 1, DIG. 2

[56] References Cited

U.S. PATENT DOCUMENTS

| | | | |
|---|---|---|---|
| 5,163,131 | 11/1992 | Row et al. | 395/200.01 |
| 5,262,875 | 11/1993 | Mincer et al. | 386/101 |
| 5,311,423 | 5/1994 | Clark | 395/208 |
| 5,371,532 | 12/1994 | Gelman et al. | 348/7 |
| 5,410,343 | 4/1995 | Coddington et al. | 348/348 |
| 5,414,455 | 5/1995 | Hooper et al. | 348/348 |
| 5,544,161 | 8/1996 | Bigham et al. | 370/58.1 |
| 5,600,644 | 2/1997 | Chang et al. | 370/396 |
| 5,606,359 | 2/1997 | Youden et al. | 348/7 |

FOREIGN PATENT DOCUMENTS

| | | | |
|---|---|---|---|
| 2071416 | 12/1993 | Canada | H04N 7/173 |
| 9513681 | 5/1995 | WIPO | H04N 7/173 |

*Primary Examiner*—Daniel H. Pan
*Attorney, Agent, or Firm*—Duke W. Yee; Wayne P. Bailey

[57] ABSTRACT

An apparatus for storing and playing videos. The apparatus includes a storage device containing a video for playback on a user system located on a communications network. The apparatus includes a system connection to a data processing system and a network connection to the communications network. The apparatus includes a transfer means for transferring the video from the storage device to the network using the network connection, wherein the video is directly transferred from the apparatus to the network.

8 Claims, 6 Drawing Sheets

VIDEO STORAGE UNIT ARCHITECTURE

CROSS-REFERENCE TO RELATED APPLICATIONS

The present application contains subject matters related to co-pending application Ser. No. 08/514,479, entitled Dual Bus Architecture For A Storage Device, Attorney Docket No. 95-020, filed on Aug. 11, 1995, now U.S. Pat. No. 5,748,871 and assigned to the assignee hereof and incorporated by reference herein.

BACKGROUND OF THE INVENTION

1. Technical Field

The present invention relates generally to an improved data processing system and in particular to an improved data processing system for transmitting information in the form of videos. Still more particularly, the present invention relates to an improved video storage architecture for transmitting and manipulating multiple video data streams.

2. Description of the Related Art

With the advance of new compression technologies, the storing of video, audio, and user data into disk storage devices has become feasible. In addition, improvements in data transmission technologies provide sufficient bandwidth for multimedia traffic. As a result, applications such as video-on-demand (VOD), video editing, interactive games, home shopping, and other multimedia applications have been developed. Video-on-demand services may include, for example, movies, sporting events, textural information, educational programs, and arts programs.

A "multimedia application" is an application that uses different forms of communication as one application. For example, information can be displayed on a data processing system using voice, text, and video simultaneously. A multimedia data processing system allows text, graphics, and audio to be displayed simultaneously. These types of multimedia applications are referred to collectively as "video", and it should be understood that a video generally includes both video and audio portions, although, in some instances, a video may only include an image portion as in textural information, or only in audio portion, as for example music.

Typically consumers, also called "users", would like videos of their choice to be available to them at times and locations convenient to them. It would be an advantageous if the videos could be delivered by any transmission medium, such as commercial telephone, cable, and satellite networks. The videos should be compatible with readily available display systems, such as NTSC standard televisions or personal computers.

Furthermore, consumers also would like to have real-time interactive control of the VOD similar to video cassette recorder (VCR) type commands that presently available VCRs provide. These types of commands are called "virtual VCR commands"—fast forwarding, pausing, or replaying portions of the video at will. Furthermore, video in the form of home shopping and video games require a much higher level of interaction and control between the video and the consumer than a video in the form of a movie. In addition, the data processing system used to provide video services should be scalable at a reasonable cost to maximize the availability of the service to large populations of consumers.

Figure 1:
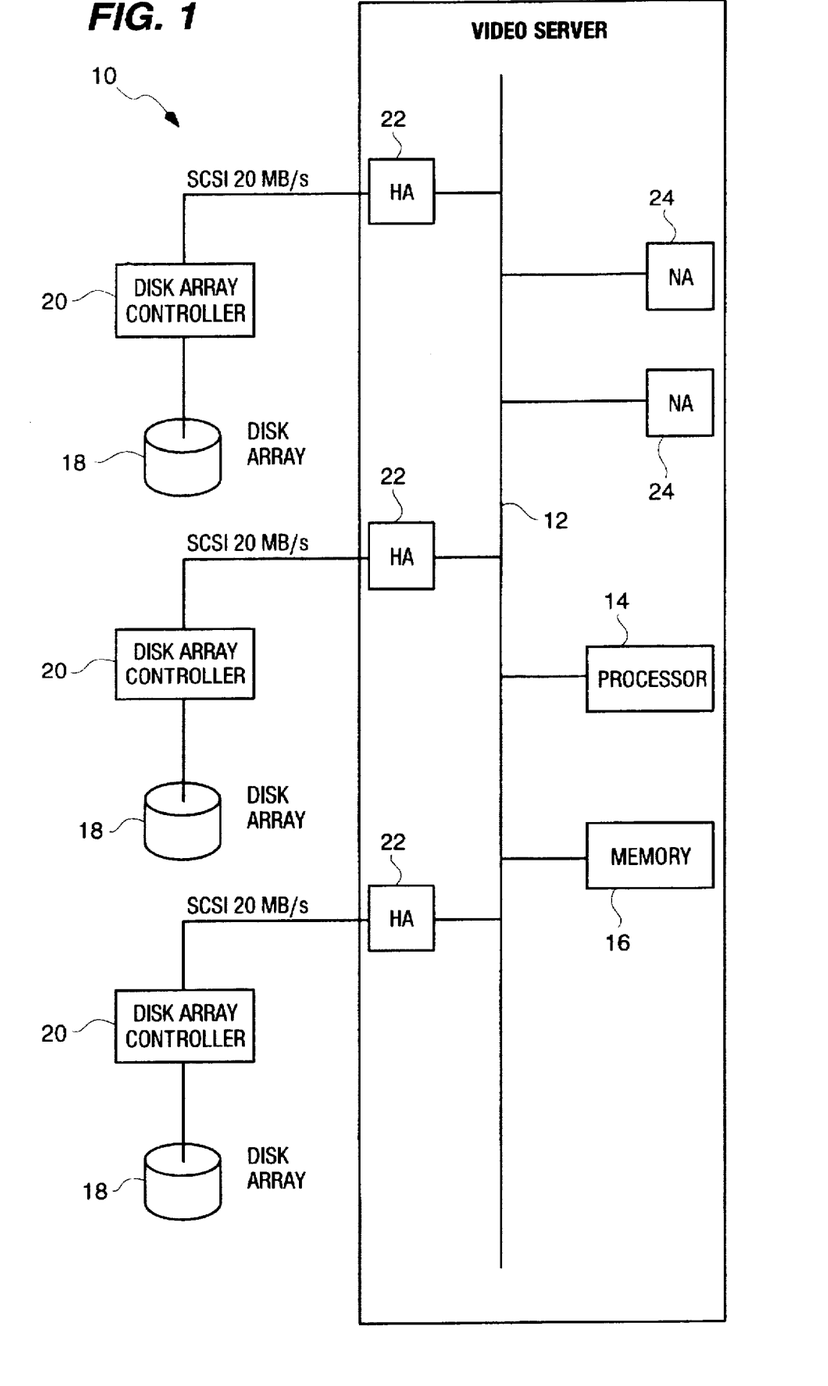
FIG. 1 is a conventional data processing system architecture, known in the art, employed to deliver video to consumers.

Such applications demand a convergence of video, computing, and telecommunication technologies to meet demands of consumers. The convergence of these technologies, necessary to meet the control and delivery of video, renders obsolete the standard architectures employed in both the computing and telephony industries. For example, video server 10 in FIG. 1 illustrates a conventional data processing system architecture employed to deliver video to consumers. Video server 10 includes a system bus 12 connected to a processor 14 and a memory 16. Video server 10 also includes disk arrays 18. Disk arrays 18 are connected to disk array controllers 20, which are in turn connected to system bus 12 via host adapters (HA) 22. Additionally, video server 10 contains network adapters (NA) 24, each having two connections, one connection to system bus 12 and another connection to a communications network (not shown). Disk arrays 18 contain compressed video data containing videos. Videos located on disk arrays 18 are sent to consumers located across a network by moving the video data from disk arrays 18 to system bus 12. From this location, the video data is moved to the network via network adapters 24. Multiple streams of video data also called "video data streams" are sent to consumers across the network from video server 10.

As the number of consumers requesting videos on the communications network increase, the amount of video storage needed increases, as does the amount of traffic on system bus 12, resulting from the movement of video data to system bus 12 and then to the communications network. In effect, a mismatch can occur in the connection of computer hardware and software to the communications network. System bus 12 in video server becomes a bottle neck for the transfer of video data from disk arrays 18 to the communications network. In addition to increased amounts of video data being transferred, the amount of traffic increases on system bus 12 because of commands received from various consumers. In particular, commands requesting new videos and commands representing VCR-like commands, also called "virtual VCR commands", for controlling the videos are received by video server 10 and processed by processor 14.

To improve the performance of video server 10, current computer technology requires implementation of high performance hardware with corresponding high cost. Typically, very high performance internal input/output (I/O) system buses are required to carry video traffic in video server 10 for any significant number of users. In addition, most very high performance system buses are vender unique and expensive. For a small number of users, the cost per video stream containing a video is not feasible.

Therefore, it would be advantageous to have an improved method and apparatus for delivering videos to users that overcome the problems described above.

SUMMARY OF THE INVENTION

The present invention provides an apparatus for storing and playing videos. The apparatus includes a storage device containing videos for playback on a user system located on a communications network. The apparatus includes a system connection to a data processing system and a network connection to the communications network. The apparatus includes a transfer means for transferring the video from the storage device to the network using the second network connection, wherein the video is directly transferred from the apparatus to the communications network.

In addition, the presently claimed invention includes a means for receiving commands from the network. These commands are processed in the apparatus and are used to control the video and how it is transferred from the storage device to the communications network.

In particular, data representing the video may be transferred from the storage device to the network connection by transferring the data from the storage device to a bus connected to the storage device and then from the bus to a buffer connected to the bus. The buffer also includes a connection to the network connection, and data is transferred directly from the buffer to the network connection.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 2:
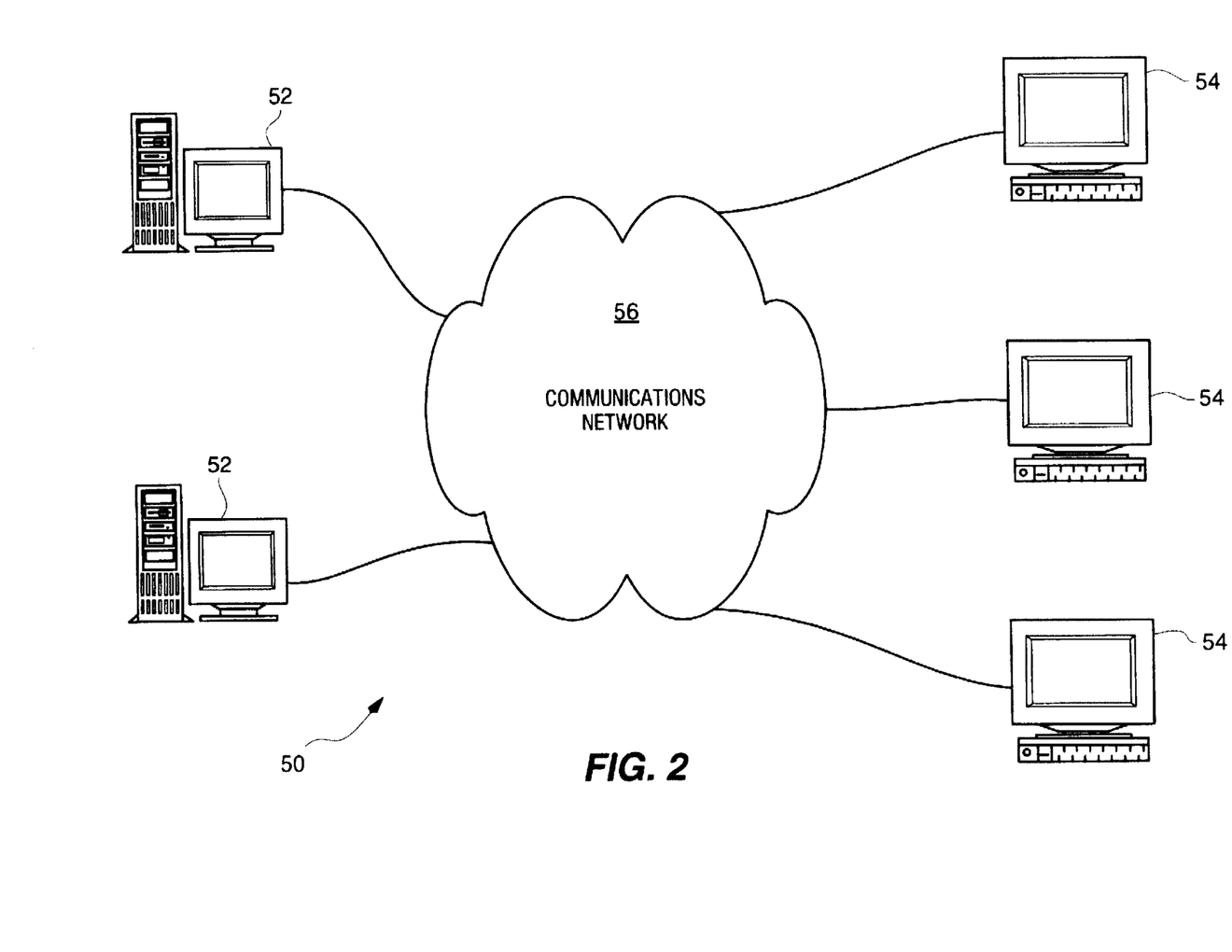
FIG. 2 is a data processing system for providing video.

With reference to FIG. 2, a distributed data processing system 50 for providing video is depicted in accordance with a preferred embodiment of the present invention. Distributed data processing system 50 includes one or more data processing systems 52, user systems 54 distributed over a large geographical area, and a communications network 56. Generally, videos are transferred from data processing system 52 to user systems 54 over communications network 56. In addition, videos may be transferred between data processing systems 52.

The physical medium employed in communications network 56 for communicating between data processing system 52 and user system 54 can be, for example, a twisted pair of wires, a coaxial cable, a fiber optic cable, a microwave link, or a satellite link. The continuous physical path used for communicating is called a "circuit". The circuit includes a relatively small bandwidth "bi-directional" channel for communicating control signals and a relatively large bandwidth "downstream" channel for communicating video data. This circuit may include additional channels, for example, a medium bandwidth channel allocated for two-way communications such as telephone service may be employed.

In the depicted example, distributed data processing system 50 is a broadband communications system including Synchronized Optical Network (SONET), Asynchronous Transfer Mode (ATM), and Intelligent Networks (IN). Services available across distributed data processing system 50 may include home shopping, video games, and VOD. In addition to these, numerous other multimedia applications may be provided by broadband communications in distributed data processing system 50.

To support audio and video, video servers in distributed data processing system 50 must support vast amounts of data. For example, 10 minutes of uncompressed full motion video typically consumes 10 or 11 gigabytes of memory. Presently available compression standards, such as Joint Photographic Experts Group (JPEG) and Motion Picture Experts Group (MPEG) are employed to compress data. More information on communication networks involving broadband communications networks and architecture along with data transfer standards can be found in *Kumar, Broadband Communications: A Professional's Guide To ATM, Frame Relay, SMDS, SONET, and BISDN*, McGraw-Hill, Inc. (1995).

User systems 54 comprise an interface/controller box connected to the network and a viewing device such as a monitor or a television in the depicted example. Alternatively, the configuration of user systems 54 may be work stations.

Figure 3:
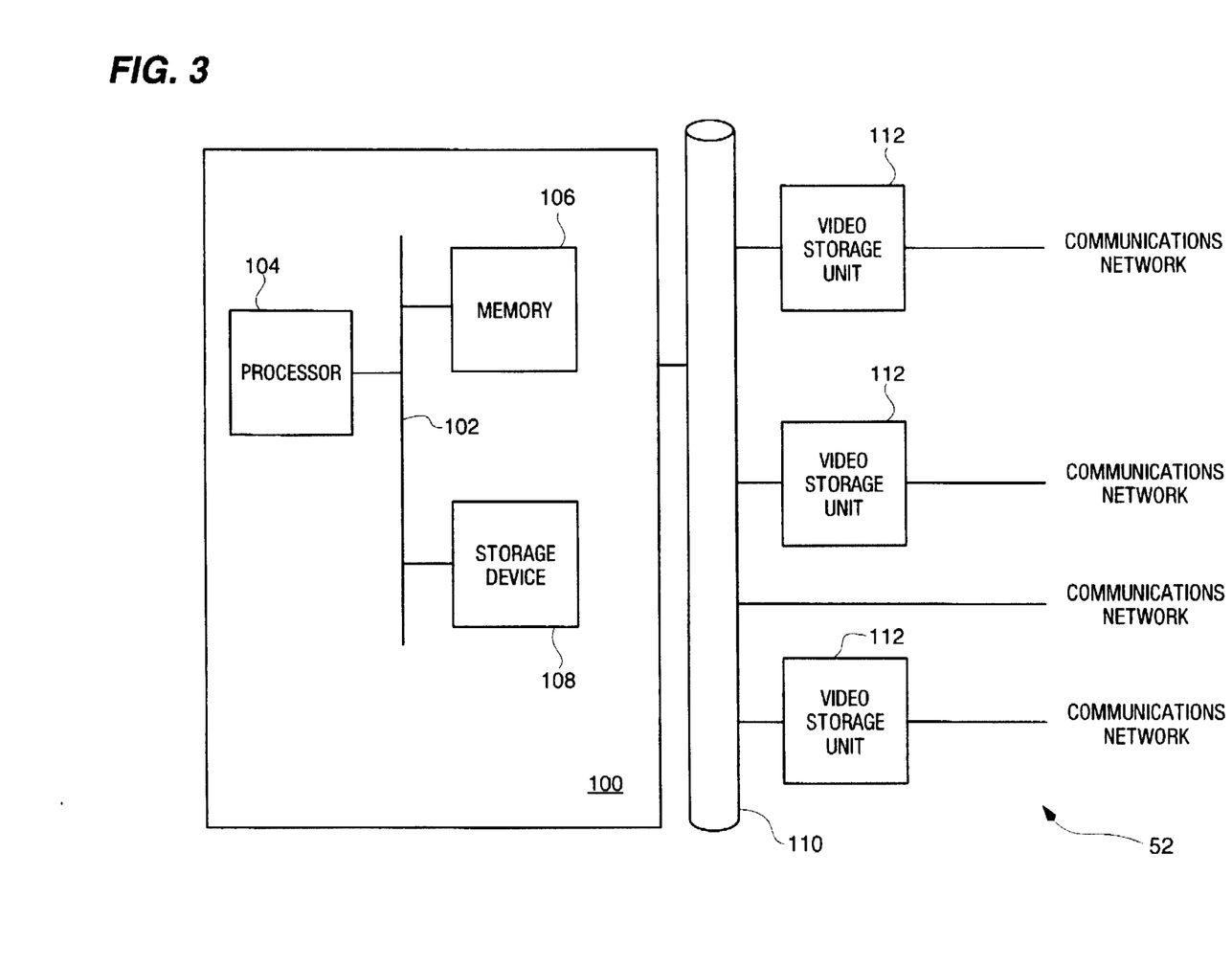
FIG. 3 is a diagram of a video server.

With reference now to FIG. 3, a diagram of a data processing system is illustrated according to the present invention. Data processing system 52 includes a video server 100 that contains a system bus 102, interconnecting a number of components. In particular, processor 104, memory 106, and storage device 108 are in communication with each other via system bus 102 inside video server 100. Programs supporting system and network management are executed by processor 104. While any appropriate processor can be used for processor 104, the Pentium microprocessor, which is sold by Intel Corporation, and the PowerPC 620, available from International Business Machines Corporation and Motorola, Inc., are examples of suitable processors. "Pentium" is a trademark of the Intel Corporation and "PowerPC" is a trademark of International Business Machines Corporation. Additionally, business support databases may be found on storage device 108. These databases are employed to track incoming requests for videos and statistical data, such as peak request times for videos, frequency of requests for videos, and identification of users requesting videos. Video server 100 is connected to a communications bus 110, like ethernet.

Specifically, video server 100 may be implemented using any suitable computer, such as the IBM PS/2 or an IBM RISC SYSTEM/6000 computer, both products of International Business Machines Corporation, located in Armonk, N.Y. "RISC SYSTEM/6000" is a trademark of International Business Machines Corporation. Additionally, video storage units 112 are connected to communications bus 110.

According to the present invention, video storage units 112 provide a solution to the problem of video/multimedia storage and I/O associated with transferring tremendous amounts of data from storage onto a communications network. Additionally, video storage units 112 improve access time to video along with continuous isochronous delivery of video while providing interactive control to users connected to communications network 56. Video storage unit 112 provides video to consumers at user systems 54 in distributed data processing system 50 by directly transferring data from video storage unit 112 to communications network 56, avoiding the bottle necks and slow downs associated with transferring data on system bus 102 in video server 100.

Video storage unit 112 also is configured to match the content capacity/network bandwidth and provides the needed capacity in bandwidth from small to very large server applications. Additionally, video storage units 112 are each capable of delivering a number of video data streams simultaneously and capable of delivering a number of video data streams from a single stored copy of a video just-in-time to users connected to communications network 56.

Video storage units 112 contain a combination of high level interface command structure, video stream control, video file management control functions, and a broadband or LAN network connection. Further, the distributed connection of video storage units 112 on communications bus 110 allows for additional video storage units to be added to scale the performance capacity of data processing system 52 based on the demands on data processing system 52.

Figure 4:
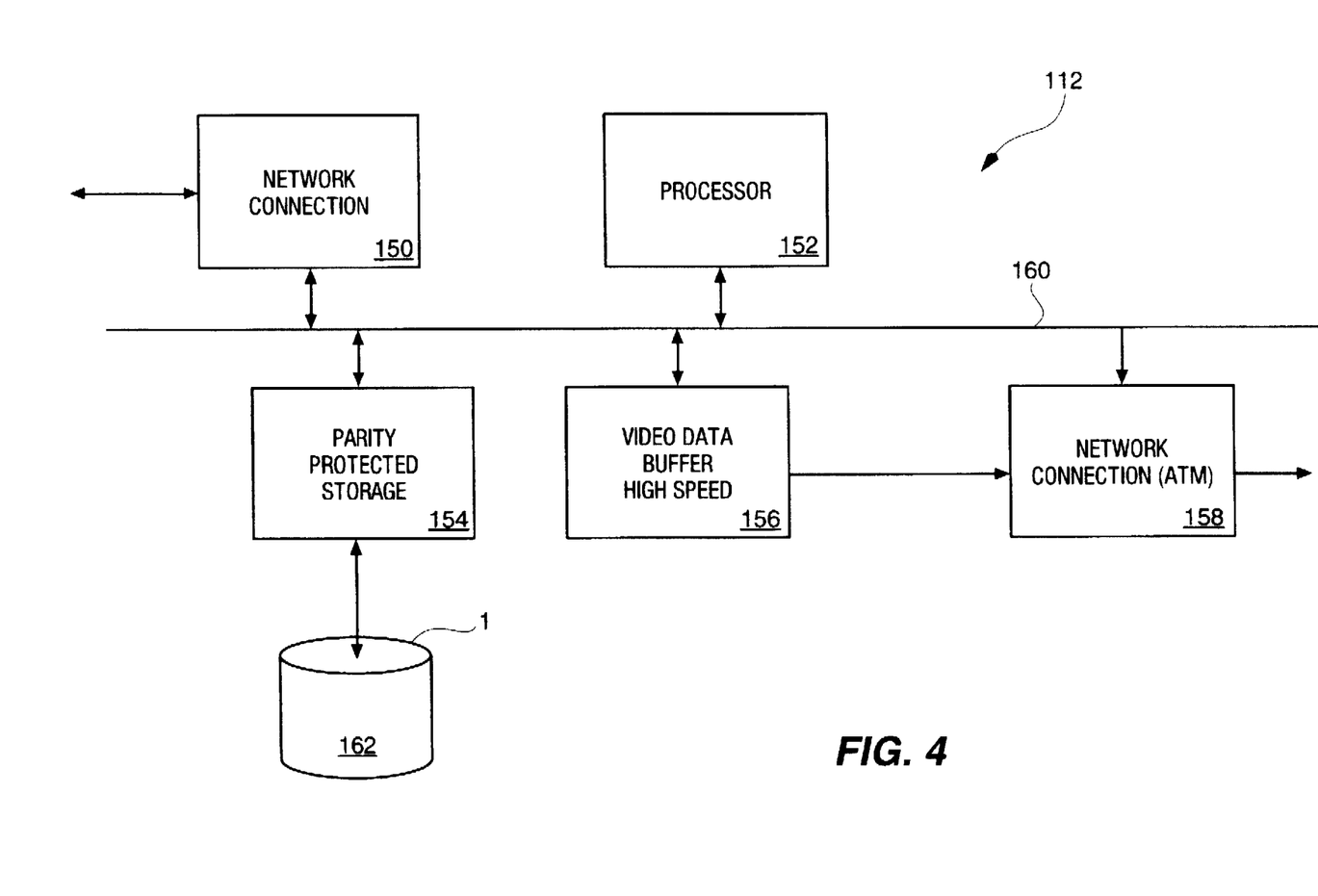
FIG. 4 is a block diagram of the architectural arrangement for a video storage unit.

Turning now to FIG. 4, a block diagram of the architectural arrangement for a video storage unit is illustrated. As can be seen in this figure, video storage unit 112 contains a network connection 150, a processor 152, a parity protected storage 154, a video data buffer 156, and a network connection 158. All of these components are connected to each other by bus 160. Network connections 150 and 158, also called "network adapters", are connection mechanisms that connect video storage unit 112 to communications bus 110 and communications network 56. Disk drives 162 are arranged to provide parity protected storage 154.

Bus 160 may be implemented using any type of bus that provides bandwidth that is matched to the capabilities of disk drives 162 and to the networks connected to video storage unit 112 through network connections 150 and 158. In the depicted example, bus 160 is a Peripheral Component Interconnect (PCI) bus. Network connection 150 provides a connection to communications bus 110 in FIG. 3.

Next, network connection 150 provides an interface to receive high level commands from communications bus 110. Although the depicted example shows network connection 150 being connected to communications bus 110, network connection 150 or some other type of connector may be connected to a data processing system, such as video server 100, using other connection mechanisms. For example, a PCI bus, an RS 232 interface, or a SCSI system may be utilized according to the present invention. The requirement for a connection mechanism employed to connect network connection 150 or some other type of connector to video server 100 is that the connection mechanism must support the transfer of commands between the video server 100, and video storage unit 112. Commands received by network connection 150 are processed by processor 152.

Processor 152 provides the intelligence for video storage unit 112. For example, processor 152 executes data stream management, video file management, video driver, RAID/ data striping algorithms and network connection software for attachment to a communications network at network connection 158. The communications network is typically a broadband network such as ATM SONET. Processor 152 may be implemented using a variety of presently available low cost processors. In particular, a Pentium processor from Intel Corporation may be employed for providing the intelligence to video storage unit 112.

Parity protected storage 154 contains the circuitry necessary to provide redundant disk operations for data availability in the event of a disk failure. In addition, parity protected storage 154 also provides data striping over multiple disk drives for increased bandwidth and controls movement of data from disk drives 162 to bus 160 in preparation for moving video data to the communications network. Parity protect storage 154 may be implemented using presently available systems that provide for drive correction in the event of disk failure.

Video data buffer 156 is used to receive data from disk drives 162 placed onto bus 160 by parity protect storage 154. The video data is transferred directly to network connection 158 for transmission to communications network 56 in a just-in-time mode of delivery to user systems 54. Video data buffer 156 also receives data that is to be sent to disk drives 162. Video data buffer 156 may be implemented in a number of ways presently known to those of ordinary skill in the art. In the depicted example, the hardware used for video data buffer 156 is selected such that it can handle data streams of 3 megabyte per second transfer rate and up to 100 of these data streams. Video data buffer 156 can be organized in a number of different ways known to those of ordinary skill in the art. For example, a rotating buffer or FIFO scheme may be employed. Network connection 158 is connected to the communications network 56, preferably a broadband network employing ATM. According to the present invention, network connection 158 may be connected to multiple channels leading to communications network 56.

Network connection 158 controls the flow of video data from video data buffer 156 to communications network 56. Additionally, network connection 158 formats the data in a network compatible format. In the depicted example, the format is an ATM cell format. Additionally, network connection 158 allows for isochronous data delivery of video and audio data.

Furthermore, network connection 158 also may receive high level commands from user systems 54 attached to communications network 56. Thus, although separate physical connections are depicted by network connections 150 and 158, these two connections may be viewed as a single logical connection and perform the same function. In other words, network connections 150 and 158 may both provide for control and video data delivery. More information on ATM networks can be found in Goralski, *Introduction to ATM Networking*, McGraw-Hill, Inc. (1995).

Figure 5:
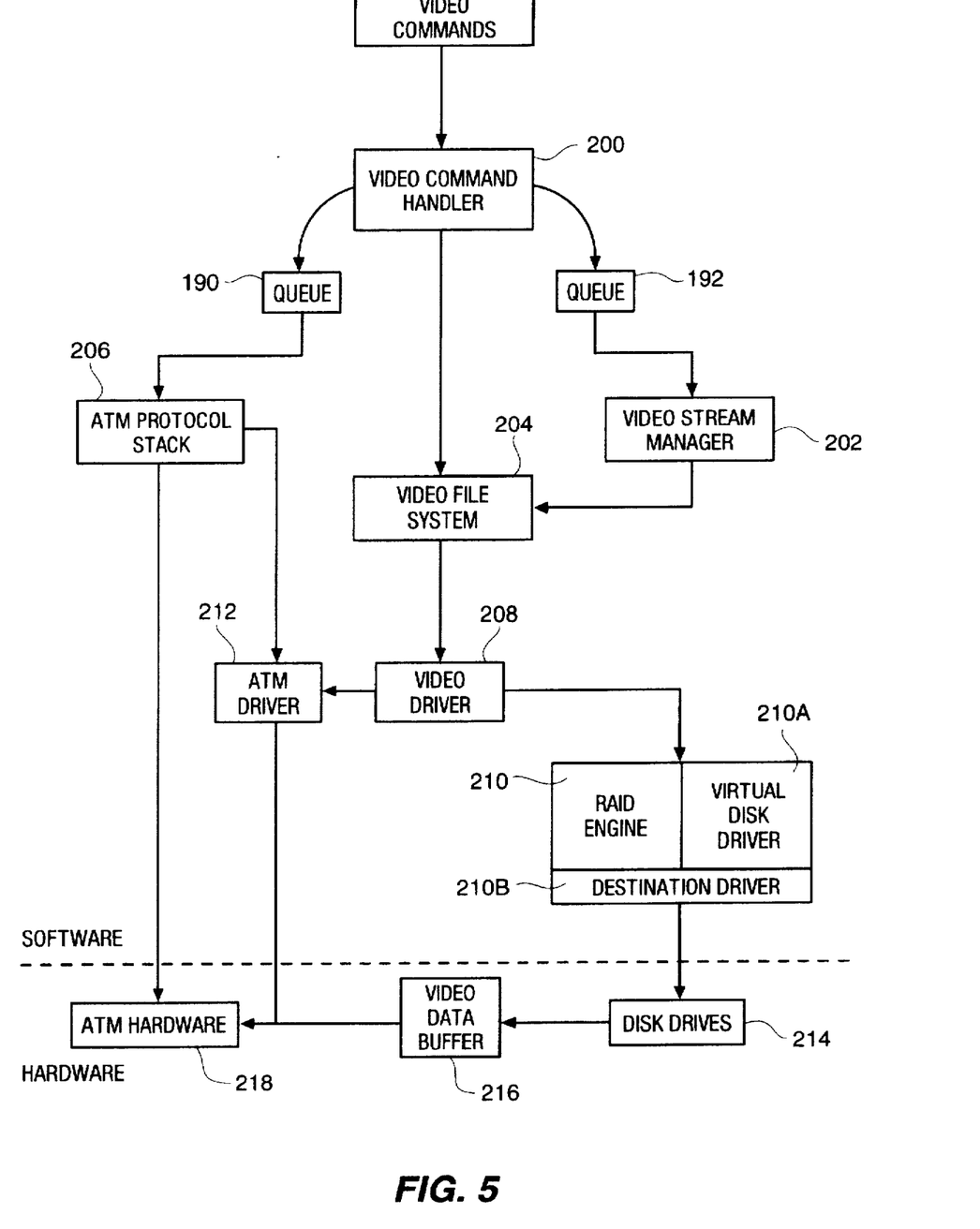
FIG. 5 is a block diagram of functional components in a video storage unit.

Turning now to FIG. 5, a block diagram of functional components in the video storage unit are illustrated. The software components my be implemented in processor 152 in FIG. 4 according to the present invention. Video data for video, such as, for example, a movie, is stored on video storage unit 112 as an MPEG file. An MPEG file for a video that is a full length movie requires a number of gigabytes of storage on the disk drives in video storage unit 112. Commands for video playback, virtual VCR commands, and video storage unit management functions are sent to the video storage unit 112 either through the video storage unit 112's connection to the communications network or through the video storage unit 112's connection to communications bus 110 which connects video storage unit 112 to video server 100.

Video command handler 200 receives and parses these commands. Depending on the command received, video command handler 200 either performs the command itself or dispatches it to other task components. Video command handler 200 dispatches commands through message queues 190 and 192 and by making direct calls. When video command handler 200 receives a result in response to a dispatched command, the result is formatted in the form of a response message and sent to the system originating the command.

Video stream manager 202 is responsible for issuing read requests to video file system 204. These requests are made in response to virtual VCR commands for starting, stopping, pausing, and resuming video streams passed from video command handler 200 to video stream manager 202. Video stream manager 202 issues read requests to video file system 204 to maintain a continuous flow of data for each active video stream. This component manages the pacing of file read requests for all active video streams. The pacing of video streams is explained in more detail below.

Video stream manager 202 may be pacing multiple video streams, e.g. 100 video streams. Additionally, two or more user systems may be requesting the same video. As a result, multiple video streams may be reading data from the same video file. For example, one user system may be receiving data at the end of a video, while another user system is receiving data at the beginning of the same video.

Consequently, video stream manager 202 may be playing multiple streams from the same video, and hence may be making request for different sections from the same video file.

ATM protocol stack 206 manages the establishment and teardown of ATM network connections between the video storage unit 112 and the user terminals 54.

Video file system 204 implements a file system for digitized video files. Video file system 204 maps requests to read or write data from a video file into request to read or write specific blocks of data on a (virtual) disk.

Video file system 204 is responsible for storing information about each video in the video storage unit and for keeping information about the location and current status of videos. Additionally, video file system 204 also tracks where each active video is currently playing.

Video driver 208 provides an interface between video file system 204 and RAID engine 210, which includes, virtual disk driver 210a and destination driver 210b. This layering of components: video driver 208 and RAID engine 210 allows replacement of these components with other video drivers or RAID engines. Video driver 208 is responsible for video command execution, requesting the actual disk I/O from RAID engine 210, and for passing data read (for read requests) to ATM driver 212. Video command execution involves maintaining controller, logical unit, and command contacts information, and based on that delivering commands to RAID engine 210. In addition, this type of command execution also involves notifying the video application of a buffer full condition and holding commands until RAID engine 210 is able to accept commands again.

Next, ATM driver 212 controls ATM hardware (i.e., network connection 158 in FIG. 4) that executes commands and packetizes data into ATM cell format. ATM driver 212 takes completed RAID engine requests and indicates that requested data on disk drives 214 have been transferred to video buffer 216 and are ready for transmission to the communications network by ATM hardware 218. Disk drives 214 correspond to disk drives 162 in FIG. 3 while buffer 216 corresponds to video data buffer 156 in FIG. 3. ATM hardware 218 is an adapter that can be implemented for network connection 158 to connect video storage unit 112 to the communications network 56.

Still with reference to FIG. 5, a description of the data flow involved in processing a play command is described below. Other virtual VCR commands follow a similar data flow in FIG. 5, but alter the rate at which data is transferred from ATM hardware 218 to communications network 56. For example, a pause command would stop playing the video while a scan forward command would send video data at forward by jumping over video sections.

In response to a command to play a video from a user system, video command handler 200 makes a call to video file system 204 to open the file for the video. In response to this call, video file system 204 opens the file and returns a file descriptor to video command handler 200. Then, video command handler 200 updates its connection/file handle association table using the file descriptor. Video command handler 200 also sends a request to ATM protocol stack 206 to establish a connection to the user system requesting the video through queue 190. Such a call may require an asynchronous call to obtain the result of the test. Video command handler 200 then sends a play request to video stream manager 202 by placing the play request on queue 192. Video stream manager 202 pulls the play request off the request queue and sets up internal data structures to process the play request. Thereafter, video stream manager 202 issues a read request to video object manager 204. According to the present invention, video stream manager 202 actually issues two read requests. The read requests are double buffered to video file system 204 to keep data flowing efficiently.

In response to the read request from video stream manager 202, video file system 204 allocates a video operation structure and initializes it for the current play request from video stream manager 202. Video driver 208 is directly called by video file system 204 using the allocated video operation data structure as input.

In response to receiving the read request for video data, video driver 208 makes an I/O call to virtual disk driver 210a in RAID engine 210. Virtual disk driver 210a processes the I/O call received from video driver 208. Data is transferred to buffer 216 from disk drives 214 in response to the I/O call processed by virtual disk driver 210a. After the requested video data is placed into buffer 216, RAID engine 210 returns information identifying the location of video data in buffer 216 to video driver 208. In response, video driver 208 takes the data buffer list from virtual disk driver 210a in RAID engine 210 and transforms the parameter list into a format useable by ATM driver 212. Video driver 208 initiates a data transfer to the ATM network by calling ATM driver 212 and passing the transformed parameter list identifying the video data and the buffer to be transferred.

In response to being called by video driver 208, ATM driver 212 formats and sends the video data out from ATM hardware 218 to the communications network. After the video data has been transferred to the ATM network, ATM driver 212 calls video driver 208 to indicate that ATM driver 212 has completed transferring video data to the communications network. At that time, video driver 208 cleans up data structures used for the transfer of video data by the ATM hardware. Video driver 208 also provides virtual disk driver 210a an indication that the data transfer has been completed. In response, virtual disk driver 210a cleans up the I/O request by freeing up cache memory blocks employed to process the I/O request. Video driver 208 sends an I/O done event back to queue 192 of video stream manager 202.

In response to receiving an I/O done notification in queue 192, a determination is made as to whether the video is finished playing. If the video is not finished, video stream manager 202 issues another read request to video file system 204. If the video has finished playing, video stream manager 202 places an I/O done event on the request queue of video command handler 200. As a result, video command handler 200 notifies the requesting user system that the video has finished.

At the end of a video, an end-of-file error is sent back to video stream manager 202, which results in the video stream manager setting a command complete flag and returning the operation to video command handler 200 for disposition.

The video storage unit of the present invention also may be employed in writing data (i.e., a new movie) to the disk drives contained in the video storage unit. For writing video data, incoming data is typically entering the video storage unit at the control network connector attached to the ethernet. Video command handler 200 receives a write command to be processed, resulting in a video operation data structure being created and other command handler data structures being updated to process the write request. Video command handler 200 calls video file system 204 to open the file for the video. Video file system 204 opens the requested file.

Afterwards, video command handler 200 issues a write request to video file system 204. Video file system 204 is responsible for storing the video data. In response to receiving the write request, video file system 204 allocates a video operation data structure and initializes it for the current write request. Thereafter, video driver 208 is called directly using the allocated video operation structure as an input. Video file system 204 is responsible for storing information about each video in the video storage unit and keeping information about the video's location and a current status.

Thereafter, video driver 208 makes an I/O call to virtual disk driver 210a in RAID engine 210. Virtual disk driver 210a is responsible for filling data structures to perform the I/O request. Virtual disk driver 210a processes the write request and sets up buffers in video buffer 216 for receiving video data. When the data buffers are ready, virtual disk driver 210a initiates a transfer of data from video buffer 216 into disk drives 214. This process continues until the data transfer is complete. An ethernet interface known to those skilled in the art is employed. Typically, the ethernet interface will obtain the video data from the ethernet, perform any necessary data translation or formatting, and place it into the buffer chain.

After the data transfer is complete, an indication of the completion is sent to video driver 208. This indication is relayed to video file system 204, which informs virtual disk driver 210a that the transfer has taken place.

Afterward, video driver 208 cleans up data structures used for the write request and calls virtual disk driver 210a to free up cache blocks used for I/O.

Thereafter, video command handler 200 formats the done notification for the host application requesting the write and sends the notification over the ethernet.

Figure 6:
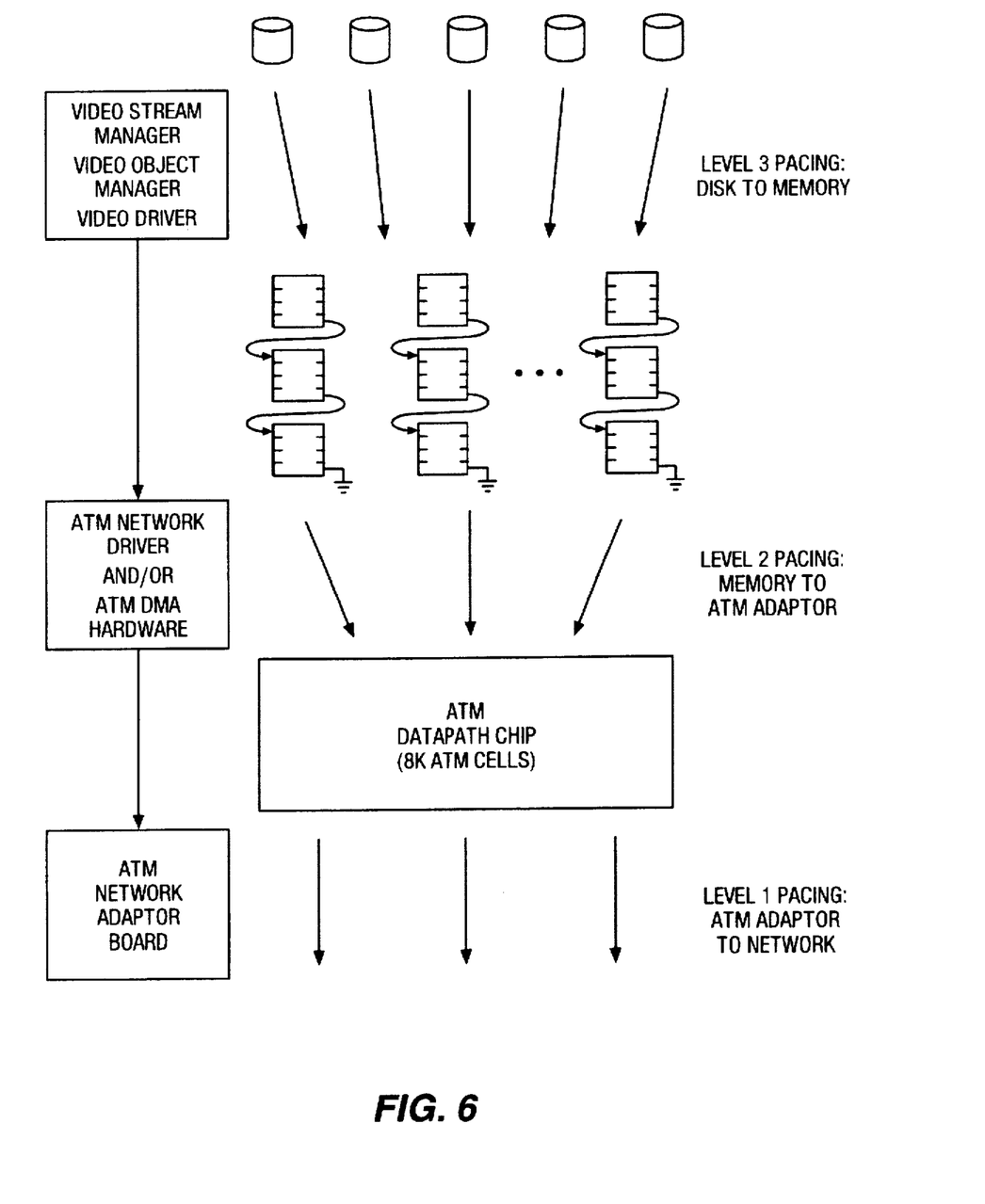
FIG. 6 is a diagram illustrating pacing of data in a video storage unit.

With reference now to FIG. 6, a diagram illustrating pacing of data in a video storage unit is depicted. Maintaining continuous transmission of data at the proper rate for each video data stream in the video storage unit is important for uninterrupted video display at user systems. Data pacing is used at three different levels in the depicted video storage unit in FIG. 4 according to the present invention. The three levels of pacing include: level 1 pacing, moving data from the ATM adapter to the communications network; level 2 pacing, moving data from the video data buffer to the ATM adapter; and level 3 pacing, moving data from the disk drives to the video data buffer. Level 1 pacing involves transmitting ATM cells from the ATM adapter to the ATM network at the required rate for each video stream. Typically, this function is performed by the ATM adapter. Level 1 pacing is employed to maintain continuity of each video stream as long as the ATM adapter has some number of cells buffered in its memory for each active video stream. If, however, the ATM adapter has scheduled a cell to be transmitted for a video stream, but no cell for that video stream is present in the ATM adapter, a discontinuity in playback may occur at the user system.

In level 2 pacing, the ATM network driver and/or the ATM DMA hardware work to ensure that the ATM adapter always has a non-zero number of cells buffered for each active video stream.

In level 3 pacing, the video stream manager, the video file system, and the video driver are responsible for ensuring that a sufficient amount of data is moved from the disks to the buffers in the video storage unit. Most of the level 3 pacing is driven by the video stream manager. A double buffering approach is employed in which, when the playback of a new video stream is started (or a video stream which was in the paused state is resumed), two back-to-back read requests are issued by the video stream manager. When data from one request has been transferred to the ATM adapter, the video driver is notified by the ATM driver, resulting in the video driver placing a read complete notification message in the video stream manager's message queue. In response, the video stream manager will check to make sure that the video stream is still in the active state (not paused and not at the end of file), and if so, issues a new read request to the video file system.

If the ATM driver does not have any data buffered for a video stream when a DMA transfer to the ATM adapter for that video stream is scheduled, an underflow error will occur. Since data transmission for a data stream is started with two back-to-back file read requests, data will still be buffered in the ATM driver when the first read-complete notification message is posted to the video stream manager's message queue.

As mentioned before, the video storage units provide an interface for virtual VCR commands, content management commands, and network connection management commands. Virtual VCR commands are employed to control the streaming of video data. For example, a play command would stream data at some selected rate while a fast forward command would cause streaming of data by skipping frames of the video. Content management commands are employed to create new videos and query existing videos controlled by the video storage unit. Network connection management commands provide connections setup and teardown between the video storage unit and a user system. Content management commands and connection management commands are typically issued by the video server to which the video storage unit is connected, while virtual VCR commands typically originate from a user system. Below are examples of interface commands that demonstrate the functions of the invention. Other commands, not described, also can be employed in the video storage unit according to the present invention.

Virtual VCR commands are used to control rate of video streams and to control the playback of video. The following is an example of a list of the virtual VCR commands:

Stream_Open

Reserve stream resources and prime a video for play. This command returns a stream handle that can be used for other virtual VCR operations.

Stream_Play

Play the video at normal rate from the specified start position to the specified end position.

Stream_Pause

Stop playing the video and maintain position as current position of video stream. The actual presentation of video frames—freeze frame, blanked, or alternate display is implementation specific.

Stream_ScanForward

Send video data at forward rates below or above the normal rate. Provides slow forward and fast forward functions.

Stream_ScanReverse

Send video data at reverse rates below or above the normal rate. Provides slow reverse and fast reverse functions.

Stream_Jump
   Jump to specified position in the video.
Stream_Status
   Return the current status of the stream.
Stream_Close
   De-activate the stream and invalidate the stream handle.

These virtual VCR commands are ones that originate from user systems to control the video.

Content management commands are used to add content to the video storage unit and to manage the content in the video storage unit (i.e., a new video). The following is an example of a list of the content management commands that may be employed:

Video_Create
   Create an entry for a video and its attributes. A video has to be created before it can be recorded.
Video_Delete
   Delete the video entry and free the storage space occupied
Video_Write
   Record the video for which an entry was earlier created. If data for this video has been previously written, then append data to the video.
Video_Read
   Returns data in a content file
Video_GetAttributes
   Query the attributes of a video. These attributes could include the size in bytes, play time duration, compression format, bit-rate requirements, etc.
Video_List
   List the names of the videos stored in the invention.

These content management commands are typically generated by the video server to which the video storage unit is attached, although another data processing system such as another video server may send the video storage unit content management commands. For example, Video_Write is employed when a new video is to be stored in a video storage unit.

Network connection management commands provide establishment and teardown of network connections between the invention and a remote destination. The remote destination may be a set-top box (e.g. ATM to the house), a hybrid fiber/coax access node (e.g. hybrid fiber/coax to the house) or a remote server. Network connection management commands are employed by the system unit to initiate a connection between the video storage unit and a user system in response to a consumer at a user system requesting a video.

The following is a list of the invention network connection management commands that may be employed:

Connection_Open
   Establish a network connection between the invention and the destination.
Connection_Close
   Tear down an established network connection between the invention and the destination.

The process is depicted and the figures above may be implemented by those of ordinary skill in the art within the data processing systems depicted in FIGS. 2 and 3.

The present invention allows implementation in large to small scale video servers for use in providing video. The present invention provides this scalable system by a combination of the video stream manager, the video, and the controlled network connections in combination with the hardware depicted in the figures and described above. In addition, the presently claimed invention provides a video storage unit architecture that provides direct network attachment to the communications network to scale the bandwidth of the video storage unit of the presently claimed invention by connection to multiple connection mechanisms to a communications network.

Furthermore, the video storage unit of the present invention provides a first connection to the video server that allows for high level commands to be sent and received through the connection mechanism connecting the video server to the video storage unit. In addition, the present invention provides the advantage of a second network connection directly connecting the video storage unit to the communications network. The present invention provides the advantage of a concise architecture containing the disk drives, the video stream control, and the direct connection to the communications network. The present invention also allows for the video storage unit to receive and process commands from user systems without requiring intervention or aid from the video server.

While the invention has been particularly shown and described with reference to a preferred embodiment, it will be understood by those skilled in the art that various changes in form and detail may be made therein without departing from the spirit and scope of the invention.

What is claimed is:

1. A data storage apparatus for storing and transferring data to a user system on a communications network comprising:

a bus;

a first network connection connected to the bus, wherein the first network connection provides a data path connection from the bus to a data processing system;

a second network connection connected to the bus, wherein the second network connection provides a connection to the communications network;

a buffer having a first connection to the bus and a second connection to the second network connection;

a storage device having a connection to the bus, wherein the storage device contains the data; and a processor including a first processor means for transferring data from the storage device to the buffer, a second processor means for transferring data from the buffer to the second network connection, and a third processor means for transferring data from the second network connection to the user system on the communications network.

2. The video storage unit of claim 1, further comprising fourth processor means for transferring data in the data storage apparatus at a selected rate.

3. A data storage apparatus for storing and transferring data to a user system on a communications network comprising:

a bus;

a first network connection connected to the bus, wherein the first network connection provides a data path connection from the bus to a data processing system;

a second network connection connected to the bus by a connection, wherein the second network connection provides a connection to the communications network;

a buffer having a first connection to the bus and a second connection to the second network connection;

a storage device having a connection to the bus, wherein the storage device contains the data; and a processor including a first processor means for transferring data from the storage device to the buffer, a second processor means for transferring data from the buffer to the second network connection, a third processor means for transferring data from the second network connection to the user system on the communications network, a fourth processor means for transferring data storage apparatus at a selected rate, and a fifth processor means for processing commands received at the first network connection and a sixth processor means for altering the selected rate of data transfer in response to receiving a command.

4. A distributed data processing system comprising:

a communications network;

a plurality of user systems connected to the communications network;

a video storage unit connected to the video server, the video storage unit including:
  a bus;
  a first network connection connected to the bus, wherein the first network connection provides a connection to a video server;
  a second network connection connected to the bus, wherein the second network connection provides a connection to the communications network;
  a buffer having a first connection to the bus and a second connection to the second network connection;
  a storage device having a connection to the bus, wherein the storage device contains data representing a video; and a processor including a first processor means for transferring data from the storage device to the bus, a second processor means for transferring data from the buffer to the second network connection, and a third processor means for transferring data from the second network connection to the user system on the communications network.

5. The distributed data processing system of claim 4, wherein the video server includes a video server processor having a processor means for receiving a request for a video from one of the plurality of user systems and processor means for initiating a transfer of the requested video from the video storage unit to the one of the plurality of user systems.

6. The distributed data processing system of claim 4, wherein the video storage unit is connected to the video server by a communications channel.

7. The distributed data processing system of claim 4, wherein the second network connection is an ATM network adapter.

8. The data processing system of claim 6, wherein the communications channel is an ethernet.

* * * * *